Jan. 15, 1929.                    I. SHULMAN                    1,698,739
                                 COLORING BOOK
                               Filed Nov. 19, 1927
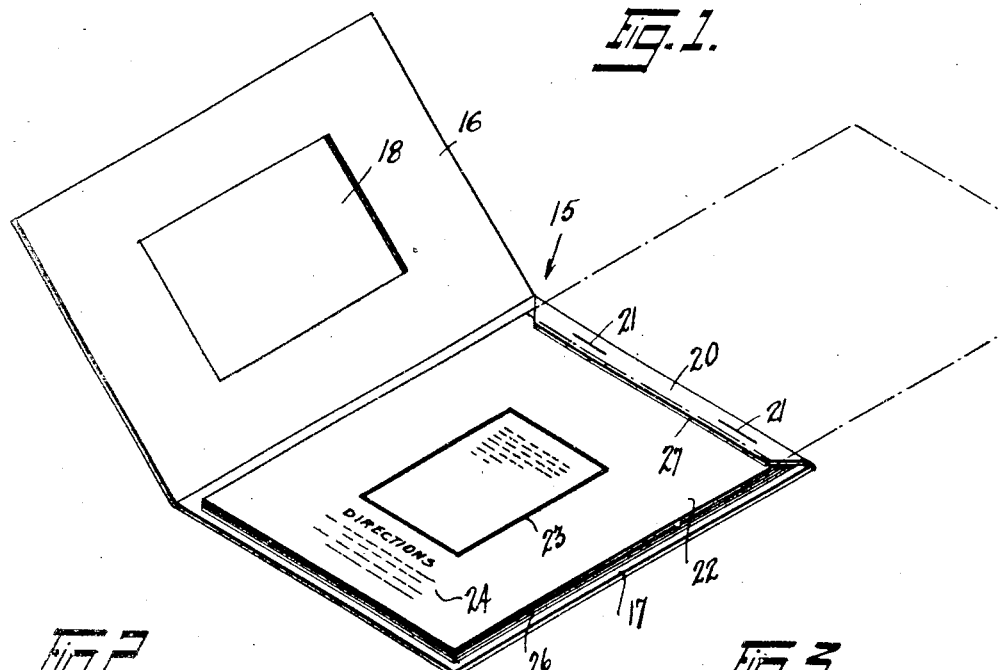
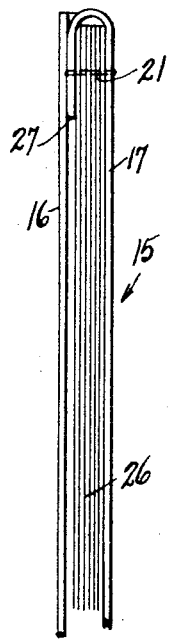
INVENTOR
Isidor Shulman.
BY
Maurice Bloch
ATTORNEY Patented Jan. 15, 1929.

1,698,739

UNITED STATES PATENT OFFICE.

ISIDOR SHULMAN, OF BROOKLYN, NEW YORK.

COLORING BOOK.

Application filed November 19, 1927. Serial No. 234,348.

This invention relates to improvements in coloring books, and has for one of its objects the provision of a book of this character having a number of colored illustrations printed at borders of the front cover thereof and corresponding uncolored illustrations on the inner pages thereof, the said cover being provided with a central opening corresponding in size with the uncolored illustration through which opening the said uncolored illustration may be colored in colors corresponding to the colored illustration on the cover front.

Another object of the invention is to number each of the colored and corresponding uncolored illustrations with the same numbers.

A further object of the invention is to provide the rear cover of the book with an overlapping section at the top thereof to provide an edge against which all preceding pages may be folded over and creased when coloring any desired ensuing illustration.

A still further object of the invention is to provide the book with a front page having educational subject matter printed thereon and visible through the opening in the front cover and also directions for painting, printed below the educational subject matter.

Another object of the invention is to produce an educational book of this nature in which the maximum simplicity of construction is secured.

Other objects and advantages will appear as the nature of the improvements is better understood, the invention consisting substantially in the novel arrangement and co-relation of parts herein fully described, and illustrated in the accompanying drawings, wherein similar reference characters are used to describe corresponding parts throughout the several views, and then finally pointed out and specifically defined and indicated in the appended claims.

The disclosure made the basis of exemplifying the present inventive concept suggests a practical embodiment thereof, but the invention is not to be restricted to the exact details of this disclosure, and the latter, therefore, is to be understood from an illustrative, rather than a restrictive standpoint.

In the drawings forming a part of this specification,

Figure 1 is a perspective view of my book with the front cover partly opened and exposing the front or direction page and showing in dot and dash lines, the turned-over position thereof, Fig. 2 is a face view of the book showing the front cover down and exposing one of the uncolored illustrations or drawings through the opening with some of the pages turned over, and Fig. 3 is a fragmental side view of the book.

Referring to the drawings in detail, 15 indicates a book of my invention, the said book being provided with a front flexible cover 16 and a rear cover 17. The front flexible cover 16 is in the form of a frame and has a rectangular opening 18 in the central portion thereof and a series of colored pictures or illustrations 19 printed at or near the margins thereof and numbered from 1 to 11 respectively.

The rear cover 17 is provided at the top thereof with a flap 20, between which flap and the rear cover 17, there are secured by means of wire fasteners 21, a number of sheets, the front sheet 22 of which, being provided with a poem or other educational subject matter enclosed in a printed frame 23. The said front page has also printed thereon directions 24 for coloring or painting illustrations 25 on the inner pages 26, the said uncolored illustrations being visible through the opening 18 in the front cover 16 when the said cover is closed. Each uncolored illustration corresponds to a colored illustration on the margin of the front cover and has the same number printed thereon as the said colored illustration. The material which defines the opening 18 forms a boundary for coloring the illustrations on the inner pages.

As shown in Fig. 1, the edge 27 of the flap 20 provides creasing means for the sheets in front, to make them stay down when they are turned back to paint or color the illustration on the following sheets.

From the foregoing it will be seen that I have provided a coloring book of simple and inexpensive construction and one that will educate children and grown-ups in the art of painting or coloring.

Having described my invention, what I claim as new and desire to secure by Letters Patent, is:—

1. In a book having a front and rear cover, the front cover of which is provided with an opening, the material defining the said opening forming a boundary, a series of colored illustrations on the front cover, sheets on the rear cover and having uncolored illustrations corresponding in design to the illustrations on the front cover and visible through the opening therein when the said cover is in closed position, a sheet containing directions for operating the book and for coloring the uncolored illustrations adapted to be read when the front cover is opened, and a flap on the rear cover forming a folding edge for the sheets when the said sheets are turned over.

2. A coloring book having a front and rear cover, the front cover of which forms an open frame, colored illustrations on the front cover, a flap on the rear cover, a plurality of sheets secured under the flap and having uncolored illustrations similar to the illustrations on the front cover, and adapted to be colored through the opening therein, and a folding edge on the flap against which the preceding sheets are folded when an illustration on an ensuing sheet is being colored.

3. A book, the front cover of which is provided with an opening, the material defining the said opening forming a boundary, a series of colored illustrations on the said cover, and a plurality of sheets foldably secured to the rear cover, having duplicate uncolored illustrations, each of which becomes visible through the opening in the front cover after the preceding sheet has been folded over, and the said front cover is closed.

4. In a coloring book, a pair of covers, one of which covers is provided with an opening, the material defining the said opening forming a boundary, a series of colored illustrations on the said cover, a flap on the other cover and a plurality of sheets foldably secured between the said flap and cover, the said sheets having corresponding uncolored illustrations in line with the opening in the first mentioned cover, each successive sheet adapted to become visible and to be colored through the said opening when the preceding sheet has been folded over.

In testimony whereof I hereunto affix my signature.

ISIDOR SHULMAN.